No. 779,614. PATENTED JAN. 10, 1905.
S. LOE.
SACK CLOSING GRAPPLE.
APPLICATION FILED MAR. 7, 1904.

Witnesses
H. B. Kilgore
A. H. Opsahl

Inventor
Syver Loe.
By his Attorneys
Williamson & Merchant

No. 779,614. Patented January 10, 1905.

UNITED STATES PATENT OFFICE.

SYVER LOE, OF MINNEAPOLIS, MINNESOTA.

SACK-CLOSING GRAPPLE.

SPECIFICATION forming part of Letters Patent No. 779,614, dated January 10, 1905.

Application filed March 7, 1904. Serial No. 196,832.

*To all whom it may concern:*

Be it known that I, SYVER LOE, a citizen of the United States, residing at Minneapolis, in the county of Hennepin and State of Minnesota, have invented certain new and useful Improvements in Sack-Closing Grapples; and I do hereby declare the following to be a full, clear, and exact description of the invention, such as will enable others skilled in the art to which it appertains to make and use the same.

My present invention has for its object to provide a simple, strong, and efficient sack-closing grapple; and to such ends it consists of the novel devices and combinations of devices hereinafter described, and defined in the claims.

The invention is illustrated in the accompanying drawings, wherein like characters indicate like parts throughout the several views.

Figure 1:
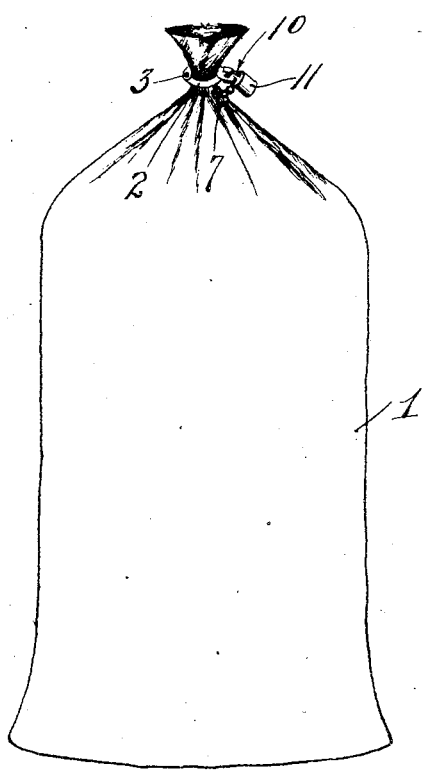
Figure 2:
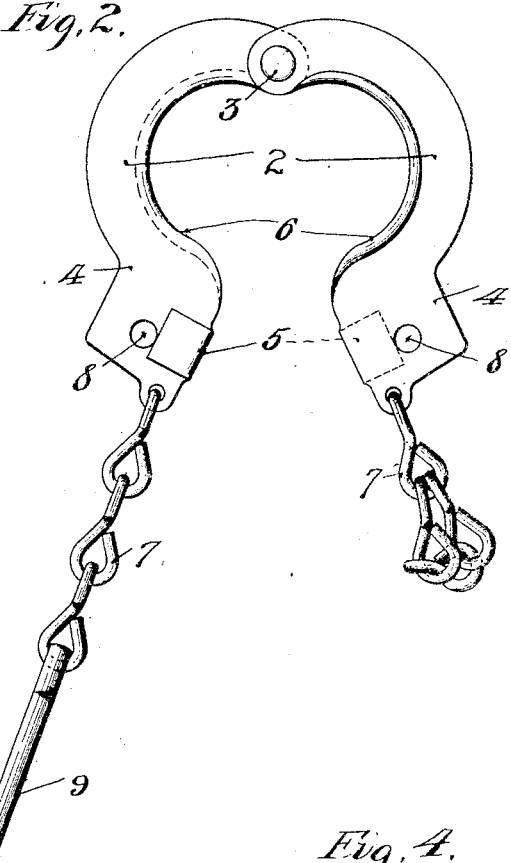
Figure 4:
Figure 3:
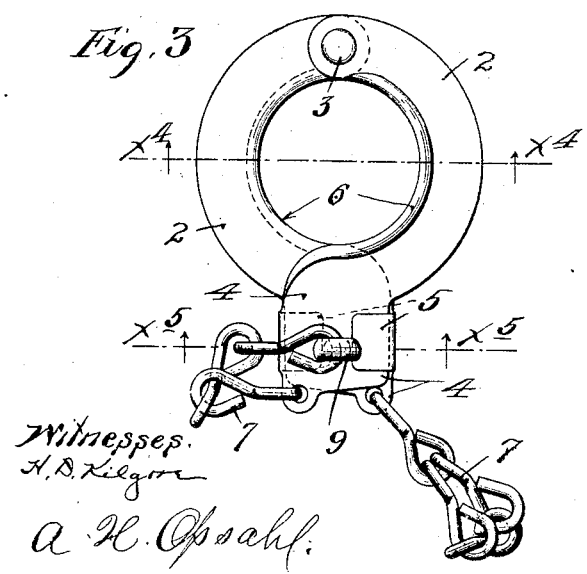

Figure 1 is a perspective view showing my improved grapple applied to close the mouth of a sack. Fig. 2 is a plan view of the grapple removed from working position, the jaws thereof being opened up. Fig. 3 is a similar view to Fig. 2, but shows the jaws of the grapple closed and interlocked. Fig. 4 is a vertical section on the line $x^4 x^4$ of Fig. 3, and Fig. 5 is a vertical section on the line $x^5 x^5$ of Fig. 3.

The numeral 1 indicates an ordinary sack. The numeral 2 indicates a pair of jaws pivotally connected at 3 and provided at their free ends with radial extensions 4, having backwardly-extended lips 5, which lips are turned backward in opposite directions and on the opposite sides of the radial portions or heads 4. The bodies of the jaws 2 are approximately semicircular, and their inner edges are preferably rolled or folded over at 6 to prevent them from cutting the sack. Short chain-sections 7 are preferably attached to the free ends of the jaws—to wit, to perforated extensions of the flat heads 4 thereof. These chain-sections afford convenient handpieces, which may be gripped in the hand. Without these handpieces it would be very difficult to tightly close the jaws onto the mouth of the sack. When the jaws of the grapple are placed loosely around the gathered mouth of the sack, the chains should be crossed in opposite directions, and by pulling on the same the jaws of the grapple may be tightly drawn onto the sack, so as to engage the lips 5 with each other or with the edges of the overlapping heads of the jaws. The heads 4 of the jaws 2 are preferably provided with perforations 8, which are adapted to register when the ends of the jaws are interlocked, as shown in Fig. 3. One of the chain-sections 7 is also preferably provided with a cotter or split key 9, which is adapted to be inserted through the coincident perforations 8 to more securely lock the grapple-jaws onto the mouth of the sack when the said jaws are interlocked, as shown in Figs. 3 and 5, at which time said perforations 8 coincide with each other.

The jaws 2 are advisably made of spring-steel and are adapted to be sprung sidewise, so as to permit the back-turned lips 5 to clear each other and to be sprung into interlocking engagement with each other or with the outer edges of the heads 4 at will.

Figure 5:
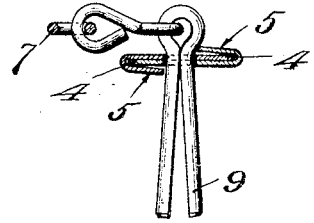

When the jaws are drawn onto the closed mouth of the sack and the lips 5 are engaged with the outer edges of the heads 4, as shown in Fig. 3, the grapple is contracted to its smallest dimension, and at such time the perforations 8 register, so that when great security is desired the cotter 9 may be inserted therethrough, as shown in Fig. 5, or, if desired, the yoke 10 of a padlock 11 may be inserted through said perforations, as shown in Fig. 1. When the mouth of the sack is too large to permit the jaws to be drawn together, as shown in Fig. 3, the lips 4 may be interlocked with each other to hold the jaws onto the sack.

The device described, while of very small cost, has in practice been found extremely efficient for the purposes had in view. It may be very quickly applied to a sack or removed therefrom and will lock the mouth of the sack with much greater security than when tied by a string or cord. Furthermore, the device may be applied to or removed from the sack as readily when gloves or mittens are worn as it may be applied with the bare hands. This is important in cold weather.

From what has been said it will be understood that the device described is capable of modification within the scope of my invention as herein set forth and claimed.

What I claim, and desire to secure by Letters Patent of the United States, is as follows:

1. A sack-closing grapple comprising a pair of jaws, pivotally connected at one end, and provided at their free ends with the extensions 4, having reversely-turned lips 5 on their inner faces, which lips 5 are adapted to interlock with each other or with the overlapped heads 4, substantially as described.

2. A sack-closing grapple comprising a pair of jaws, pivotally connected at one end, and provided at their free ends with interlocking parts on their inner faces and with loosely-connected handpiece extensions, substantially as described.

3. A sack-closing grapple comprising a pair of jaws, pivotally connected at one end, and provided at their free ends with extensions 4, having reversely back-turned edges 5 on their inner faces, and perforations 8, and chain-sections attached to said extensions 4, one of said chains having a key 9 adapted to be inserted through said perforations 8, substantially as described.

In testimony whereof I affix my signature in presence of two witnesses.

SYVER LOE.

Witnesses:
 H. D. KILGORE,
 F. D. MERCHANT.